United States Patent [19]

Zebisch

[11] Patent Number: 4,620,091
[45] Date of Patent: Oct. 28, 1986

[54] MOUNTING SUPPORT FOR SEVERAL PHOTOTRANSMITTERS AND PHOTORECEIVERS

[75] Inventor: Manfred W. Zebisch, Georgensgmünd, Fed. Rep. of Germany

[73] Assignee: International Standard Electric Corporation, New York, N.Y.

[21] Appl. No.: 562,663

[22] Filed: Dec. 19, 1983

[30] Foreign Application Priority Data

Dec. 22, 1982 [DE] Fed. Rep. of Germany ....... 3247447

[51] Int. Cl.[4] ............................................. G01D 5/34
[52] U.S. Cl. ............................. 250/231 SE; 250/239
[58] Field of Search ............. 250/231 SE, 237 G, 239; 356/395

[56] References Cited

U.S. PATENT DOCUMENTS 4,182,953 1/1980 Hurley, III et al. .......... 250/231 SE
4,190,767 2/1980 Crouse ............................ 250/239 X Primary Examiner—John P. McIntosh
Attorney, Agent, or Firm—T. L. Peterson; J. S. Christopher

[57] ABSTRACT

The invention relates to a mounting support (1) for phototransmitters (10) and photoreceivers (11) to be arranged in the way of forked light barriers, between which the rim portion of a signal disk (28) is capable of being moved. On the mounting support (1) there are provided insertion openings (8, 9) for inserting the phototransmitters (10) and the photoreceivers (11). These are provided with a locking element with which the inserted phototransmitter (10) or the inserted photoreceiver (11) can be locked and thus definitely fixed in their positions. No other adjustments are required.

3 Claims, 4 Drawing Figures

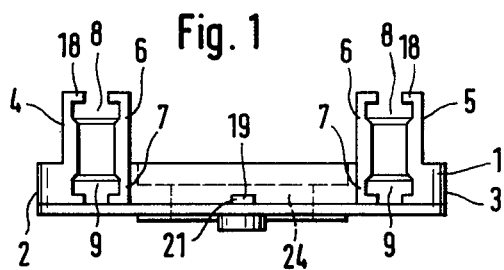
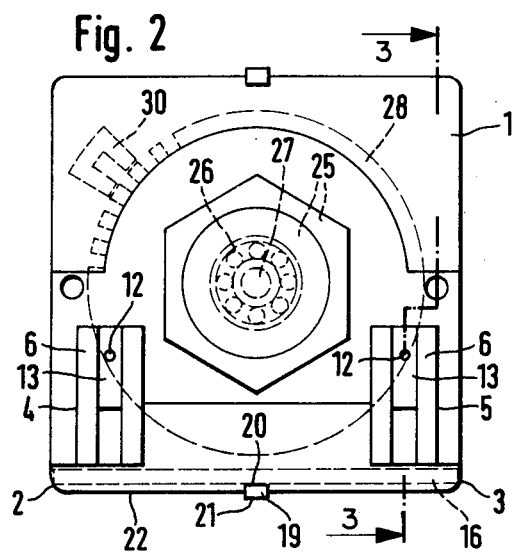
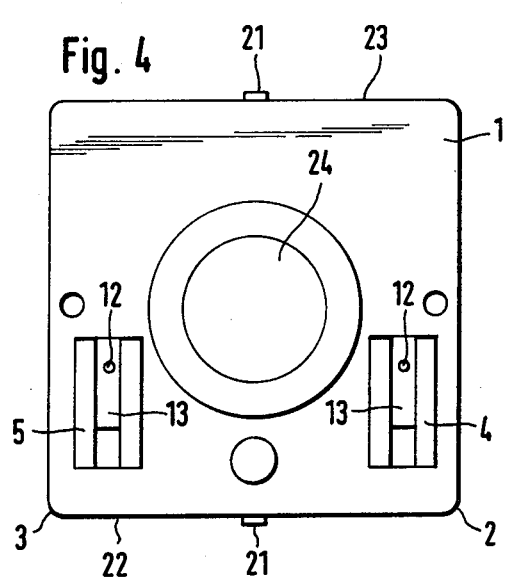
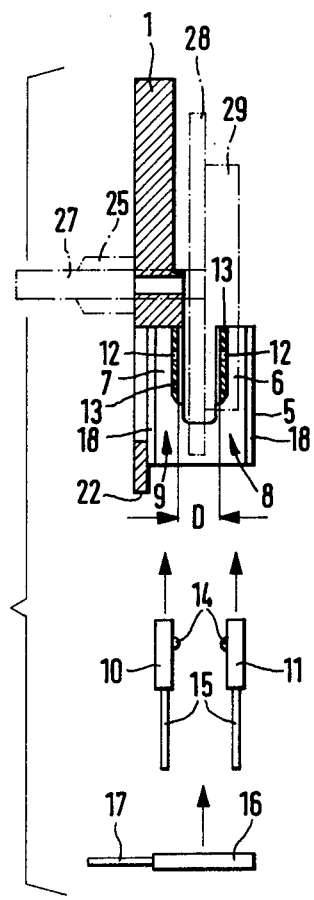

MOUNTING SUPPORT FOR SEVERAL PHOTOTRANSMITTERS AND PHOTORECEIVERS

The present invention relates to a mounting support for several phototransmitters and photoreceivers as set forth in the preamble of claim 1.

From DE-OS Nos. 27 26 242 and 27 45 467 it is known, with respect to rotary pulse generators, to arrange on a printed circuit board, two forked light barriers next to each other at a corresponding angular distance. The printed circuit board is inserted into corresponding receptacles of the housing, and adjusted. In the course of this, prefabricated forked light barriers are used, in which both the receivers and transmitters are molded into a U-shaped plastics part, and adjusted therein.

The present invention is aimed at solving the problem of being able to use phototransmitters and photoreceivers, hence, e.g. light-emitting diodes, such as infrared-emitting diodes, and photodetectors, such as photodiodes or phototransistors, as individual components for a signal generator, and yet to obtain during the mounting, an unobjectionable fixing of position without this involving any noteworthy investment in labor.

This object is achieved by the features set forth in the characterizing part of claim 1. By using a mounting support with plug-in or insertion openings and locking means for fixing the position, the unobjectionable holding in an adjusted position becomes possible by simply inserting the light-emitting or receiving components. A readjustment is not required and in the event of a failure of a component, the latter can simply be replaced by another one without involving any noteworthy investment or requiring any readjustment.

Further advantageous details of the invention are set forth in the subclaims and will now be described hereinafter with reference to an example of the preferred embodiment of the invention. In the accompanying drawing.

FIG. 1 shows a front view of the mounting support,

FIG. 2 shows a top view on the mounting support,

FIG. 3 is a sectional view taken on line 3—3 of FIG. 2, and

FIG. 4 is a view on to the bottom side of the mounting support.

The reference numeral 1 indicates a mounting support which, for example, is designed either as a plate or baseplate of a housing. In the top view it is shown to have, for example, a square shape, and within the area of the corners, e.g. of neighboring corners 2 and 3, there is each time arranged a U-shaped member 4, 5 in the legs 6 and 7 of which there is each time provided one insertion opening 8 or 9 respectively.

In the example of the preferred embodiment the lower leg 7 is integrated into the mounting support 1, or the latter forms the leg 7. In each pair of insertion openings 8, 9 as provided for in the U-shaped member 4, 5, a phototransmitter 10 is capable of being inserted into one of the insertion openings 8 or 9, and a photoreceiver 11 is capable of being inserted into one of the other insertion openings 9 or 8 respectively. The insertion openings 8, 9 are spaced apart by about the distance D. Through this distance, a signal generator is capable of being moved. As the phototransmitter there is appropriately used an infrared light-emitting diode and as the photoreceiver there is used a phototransistor or a photodiode particularly suitable for infrared. However, also other optical or electromagnetic components, such as permanent magnets and Hall generators can be used.

The insertion openings 8, 9, in their cross-sections are advantageously adapted to that of the phototransmitter 10 or photoreceiver 11 to be inserted, and are e.g. rectangular, and at least one broad side 18 may be continuously longitudinally slotted.

In order to safeguard an exact fixing of position of the phototransmitters 10 or photoreceivers 11 in either the insertion opening 8 or 9, these insertion openings 8, 9 are each provided with at least one locking element which, in the example of the preferred embodiment, is designed as an opening 12, which may cooperate with edges or parts of the inserted phototransmitter 10 or photoreceiver 11. In this way there is achieved the exact positioning of the phototransmitter 10 with respect to the photoreceiver 11 and of both of them on the mounting support 1 with respect to a signal generator to be inserted, by way of simple plugging-in.

As the locking element 12 there is used in this case the opening 12 in the leg 6 or 7 as provided for in a wall or in a wall member 13, lying opposite the opening 12 in the wall member 13 of the other leg 7 or 6 arranged opposite this particular wall member. These walls 13 serve as bearing surfaces for the phototransmitters 10 or photoreceivers 11 to be inserted. Appropriately, the wall 13 is of a resilient elastically deformable design. This is achieved, for example, by using an elastic plastics material as the material for the mounting support 1 and by providing a correspondingly small wall thickness of the walls 13 and/or by cutting the same free on at least one side or in the center, etc.

The opening 12 is capable of being lockingly engaged by the focusing lenticular elevation 14 of the phototransmitter 10 or of the photoreceiver 11 provided for within the area of the light outlet or inlet of the phototransmitter 10 or the photoreceiver 11 respectively. By this there is thus guaranteed an exact assignment of the components and an exact passage of rays from the transmitter 10 to the receiver 11. Owing to a U-shaped member 4, 5 with the legs 6, 7 and the insertion openings 8, 9 being manufactured in one single part, in particular an injection-molded part together with the mounting support 1, there is always achieved an exact positioning of the phototransmitters 10 and of the photoreceivers 11 with the aid of the locking elements 12. The U-shaped members 4, 5 or the legs 6, 7 or the insertion openings 8, 9 thereof, are preferably arranged in such a way that the phototransmitters 10 and the photoreceivers 11 can be inserted in such a way, e.g. parallel in relation to one another, that their terminals 15 always point in one direction. In this way it is possible to arrange them on one common substrate, for example, a printed circuit board 16 with plug or soldered connections 17 and with corresponding printed conductors and, if so required, with amplifier components, etc., arranged thereon. According to the invention, the assembly can be made in such a way that first of all the phototransmitters 10 and the photoreceivers 11 are lockingly inserted into the insertion openings 8, 9, with the printed circuit board 16 being positioned thereafter and the terminals 15 being soldered to the printed conductors thereof. For holding and fixing in position the printed circuit board 16, corresponding means are provided for on the mounting support 1, such as a fixing element 19 which is appropriately provided for between two pairs of insertion openings 8, 9. This element slightly projects towards both the inside and the outside. The inwardly projecting portion 20 thereof serves the fixing the position of the printed circuit board 16, and the outer portion 21 thereof serves as a locking means for an opposite locking member of a cover of the housing capable of being placed on to the mounting support 1, and which is not particulrly shown in the drawing. A further locking element 21 for the cover of the housing is appropriately provided for at the rim portion 23 lying opposite the rim portion 22.

Centrally in the mounting support 1, there is preferably provided an opening 24 into which a bearing bush 25, provided with a hexagonal attachment for a bearing 26 indicated by the dashline, and a rotatable adjusting shaft 27 is pressed or molded. To the rotatable adjusting shaft 27 a signal disk 28 is mounted, which may be connected with a flywheel 29 or may form one structural unit therewith. The signal disk 28 may be provided along its circumference with alternating transparent and nontransparent radial stripes, or may be designed as a studded disk, with the teeth thereof alternatingly interrupting the radiation between each pair of phototransmitters 10 and photoreceivers 11 during rotation.

Appropriately, the studded disk 28 is made from a magnitizable material, and on either the mounting support 1 or in an associated cover of the housing there is provided at least one permanent magnet 30 which, in cooperation with the teeth, effects a magnetic rest. In this way, the rotatable adjusting shaft 27 always achieves a defined rest position, and in the course of the slow rotation of the adjusting shaft 27 there may be effected a raster-like rotational movement.

Several pairs of insertion openings 8, 9 may be arranged on the mounting support 1 by being staggered with respect to one another by various angular positions. According to the invention, however, at least two pairs are so arranged in the conventional way that, from the signals resulting from the rotation of the signal disk 28, the direction of rotation of the adjusting shaft 27 can be determined.

I claim:

1. Mounting support for several phototransmitters and photoreceivers comprised of a baseplate having a plurality of pairs of U-shaped members, each perpendicular to said baseplate with its two legs parallel to said base-plate and a slot in each leg along its length for receiving said phototransmitters and photoreceivers, each slot forming a bearing surface for a phototransmitter or photoreceiver, arranged in pairs with a distance being left free between each one phototransmitter and one photoreceiver of a pair sufficient for a light interrupting member to be moved therebetween, characterized in that on the mounting support there are provided by said slots in each pair of U-shaped members one pair of associated insertion openings in the parallel legs of said U-shaped members, which are spaced apart at least by said distance and into which each one phototransmitter or photoreceiver is capable of being inserted, and that within the area of each insertion opening there is provided a locking means with the aid of which the inserted phototransmitter or photoreceiver, in the inserted state, is capable of being locked in a coaxially aligned position.

2. A mounting support as defined in claim 1, characterized in that one bearing surface formed by a wall member of each leg for a phototransmitter or photoreceiver is resiliently deflectable to accommodate said locking means and, with the aid of said locking means is capable of retaining said phototransmitter or said photoreceiver lockingly in the coaxially aligned position.

3. A mounting support as claimed in claim 2, characterized in that said locking means of each insertion opening in a leg is comprised of an opening in said wall member forming a bearing surface for the phototransmitter or photoreceiver, and the locking openings for each pair of phototransmitter and photoreceiver are coaxially aligned in wall members of the insertion openings opposite to each other, and each phototransmitter and photoreceiver of a pair has protruding therefrom a lenticular light director of a dimension relative to said locking opening to be engaged in a position-fixing manner, whereby said lenticular light directors are coaxially aligned in the defined position.

* * * * *